US012661930B2

(12) United States Patent　　　　　(10) Patent No.:　US 12,661,930 B2

Costlow et al.　　　　　　　　　　　　　(45) Date of Patent:　Jun. 23, 2026

---

(54) TIRE WITH SPOKE LOOPS

(71) Applicant: Bridgestone Americas Tire Operations, LLC, Nashville, TN (US)

(72) Inventors: Douglas B. Costlow, Akron, OH (US); Andrew V. Haidet, Silver Lake, OH (US); Adam K. Nesbitt, Akron, OH (US); Sharon E. Reinhardt, Fairlawn, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 18/908,151

(22) Filed: Oct. 7, 2024

(65) Prior Publication Data

US 2025/0026151 A1　　Jan. 23, 2025

Related U.S. Application Data

(62) Division of application No. 16/607,759, filed as application No. PCT/US2018/026024 on Apr. 4, 2018, now Pat. No. 12,138,971.

(60) Provisional application No. 62/490,954, filed on Apr. 27, 2017.

(51) Int. Cl.
　　*B60C 7/14*　　　　(2006.01)
　　*B29D 30/02*　　　(2006.01)
　　*B60B 9/26*　　　　(2006.01)

(52) U.S. Cl.
　　CPC ............... *B60C 7/14* (2013.01); *B29D 30/02* (2013.01); *B60B 9/26* (2013.01); *B60B 2310/204* (2013.01); *B60B 2360/50* (2013.01); *B60C 7/146* (2021.08)

(58) Field of Classification Search
None
See application file for complete search history.

(56) References Cited

U.S. PATENT DOCUMENTS

| | | | |
|---|---|---|---|
| 1,134,011 A | 3/1915 | Retzlaff | |
| 1,146,708 A | 7/1915 | Hooton | |
| 1,366,619 A * | 1/1921 | Winders | B60B 9/26 152/20 |
| 1,627,418 A * | 5/1927 | Starr | B60B 9/26 152/80 |
| 2,022,217 A | 11/1935 | Rimailho | |

(Continued)

FOREIGN PATENT DOCUMENTS

| | | |
|---|---|---|
| CN | 2418030 | 2/2001 |
| CN | 103338918 | 10/2013 |

(Continued)

OTHER PUBLICATIONS

International Search Report and Written Opinion; Corresponding PCT Application Serial No. PCT/US2018/026024; Authorized Officer Jong Kyung Lee; dated Jul. 23, 2018.

(Continued)

*Primary Examiner* — Sedef E Paquette
*Assistant Examiner* — Alexander D Booth
(74) *Attorney, Agent, or Firm* — Shaun J. Fox; Bryan J. Jaketic

(57) ABSTRACT

A nonpneumatic tire assembly includes an outer hoop, a plurality of loops extending inward from the outer hoop, and a hub having a plurality of members. Each of the plurality of members is connected to one of the plurality of loops.

16 Claims, 12 Drawing Sheets

(56) References Cited

U.S. PATENT DOCUMENTS

| | | | |
|---|---|---|---|
| 2,137,288 | A | 11/1938 | Horn |
| 2,282,638 | A * | 5/1942 | Boyer ........................ B60B 9/10 |
| | | | 152/40 |
| 4,235,270 | A | 11/1980 | Kahaner |
| 4,741,223 | A | 5/1988 | Kondo et al. |
| 5,802,830 | A | 9/1998 | Kawatani |
| 2002/0104605 | A1 | 8/2002 | Ikehara |
| 2004/0069385 | A1 | 4/2004 | Timoney et al. |
| 2011/0024008 | A1 | 2/2011 | Manesh |
| 2011/0272254 | A1 | 11/2011 | Anderfaas et al. |
| 2014/0191564 | A1 | 7/2014 | Gebeau |
| 2014/0346847 | A1 | 11/2014 | Werner et al. |
| 2015/0122384 | A1 | 5/2015 | Dilworth |
| 2018/0029422 | A1 | 2/2018 | Thompson |
| 2018/0134072 | A1 * | 5/2018 | Celik ........................ B60C 7/24 |

FOREIGN PATENT DOCUMENTS

| | | |
|---|---|---|
| CN | 103350608 | 10/2013 |
| DE | 314575 | 9/1919 |
| EP | 1378377 | 1/2004 |
| GB | 1137419 | 11/1966 |
| JP | S53-43315 | 4/1978 |
| JP | H01311902 | 12/1989 |
| JP | 2015116870 | 6/2015 |
| KR | 10-2007-0045876 | 5/2007 |
| WO | 2007057975 | 5/2007 |
| WO | 2007131643 | 11/2007 |
| WO | 2016123180 | 8/2016 |

OTHER PUBLICATIONS

European Search Report; Corresponding EP Application Serial No. 18790950.2; dated Oct. 27, 2020.

U.S. Pat. No. 823,384; issued Jun. 12, 1906; Bardet (this form did not accept the 6-digit patent number in the U.S. Patents Section).

U.S. Pat. No. 941,289; issued Nov. 23, 1909; Tizard (this form did not accept the 6-digit patent number in the U.S. Patents Section).

U.S. Pat. No. 624,315; issued May 2, 1899; Finin (this form did not accept the 6-digit patent number in the U.S. Patents Section).

U.S. Pat. No. 482,175; issued Sep. 6, 1892; Hollafolla (this form did not accept the 6-digit patent number in the U.S. Patents Section).

Liu Zaijie, et al.,Panoramic Home Decoration, Chinese Youth Publishing House—Beijing, p. 39, Jun. 1991.

Concise Handbook of Raw Materials and Equipment in Rubber Industry 2016 Edition, by Editorial board of Concise Handbook of Raw Materials and Equipment in Rubber Industry, Beijing Institute of Technology Press, p. 364, Nov. 2016.

ESpaceNet Translation of JP2015116870 (Year: 2022).

A Plastic Spare Tire? (Sep. 1987). Popular Mechanics, 110-110. (Year: 1987).

* cited by examiner

300

310

300

320

300

330

320

300

330

320

570

TIRE WITH SPOKE LOOPS

CROSS-REFERENCE TO RELATED APPLICATIONS

This application is a divisional of U.S. patent application Ser. No. 16/607,759, filed on Oct. 24, 2019, which was a national stage entry of International Application No. PCT/US2018/026024, filed on Apr. 4, 2018, which in turn claims the benefit of U.S. Provisional Patent Application No. 62/490,954, filed on Apr. 27, 2017. The disclosures of each of these documents are incorporated by reference herein in their entirety.

FIELD OF INVENTION

The present disclosure relates to a tire having spokes. More particularly, the present disclosure relates to a non-pneumatic tire having a plurality of spokes formed by a loop of material.

BACKGROUND

Various tire constructions have been developed which enable a tire to run in an uninflated or underinflated condition. "Run flat tires" may continue to operate after being punctured and experiencing a complete or partial loss of pressurized air for extended periods of time and at relatively high speeds. Non-pneumatic tires do not require inflation and may be particularly useful in off-road applications and in locations where it would be difficult to repair or replace a tire. Some known non-pneumatic tires include a plurality of spokes extending between an inner hoop and an outer hoop.

SUMMARY

In one embodiment, a nonpneumatic tire has a central axis and an equatorial plane. The nonpneumatic tire includes a serpentine spoke ply disposed continuously about the central axis of the tire, such that the serpentine spoke ply follows a winding path between an inner diameter and an outer diameter. The serpentine spoke path also has a plurality of inner portions that extend in a substantially circumferential direction about the inner diameter and a plurality of outer portions that extend in a substantially circumferential direction about the outer diameter. The serpentine spoke path further has a plurality of spoke portions that extend between the inner diameter and the outer diameter. The tire also has an outer hoop connected to the plurality of outer portions of the serpentine spoke ply and a hub connected to the plurality of inner portions of the serpentine spoke ply. The tire further includes a hub connected to a plurality of mounting members. The hub has a flange portion. Each of the plurality of mounting members includes a mounting bar and a plurality of bolts connecting the mounting bar to the flange portion of the hub. Each of the plurality of inner portions engages the mounting bar of a corresponding mounting member. The mounting bar and the plurality of bolts are arranged such that tightening the plurality of bolts applies tension to the serpentine spoke ply in a radial direction.

In another embodiment, a nonpneumatic tire assembly includes an outer hoop, a plurality of loops extending inward from the outer hoop, and a hub having a plurality of members. Each of the plurality of members is connected to one of the plurality of loops.

In yet another embodiment, a nonpneumatic tire assembly includes an outer hoop, a plurality of loops extending inward from the outer hoop, and a hub connected to a plurality of mounting members. The hub has a flange portion. Each of the plurality of mounting members includes a mounting bar and a plurality of bolts connecting the mounting bar to the flange portion of the hub. Each of the plurality of loops engages the mounting bar of a corresponding mounting member. The mounting bar and the plurality of bolts are arranged such that tightening the plurality of bolts applies tension to the plurality of loops in a radial direction.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Radial" and "radially" refer to a direction perpendicular to the axis of rotation of a tire.

"Tread" refers to that portion of the tire that comes into contact with the road under normal inflation and load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

Likewise, the terms "inward" and "inwardly" refer to a general direction towards the axis of rotation, whereas "outward" and "outwardly" refer to a general direction away from the axis of rotation and towards the tread of the tire. Thus, when relative directional terms such as "inner" and "outer" are used in connection with an element, the "inner" element is spaced closer to the axis of rotation of the tire than the "outer" element.

Figure 1A:
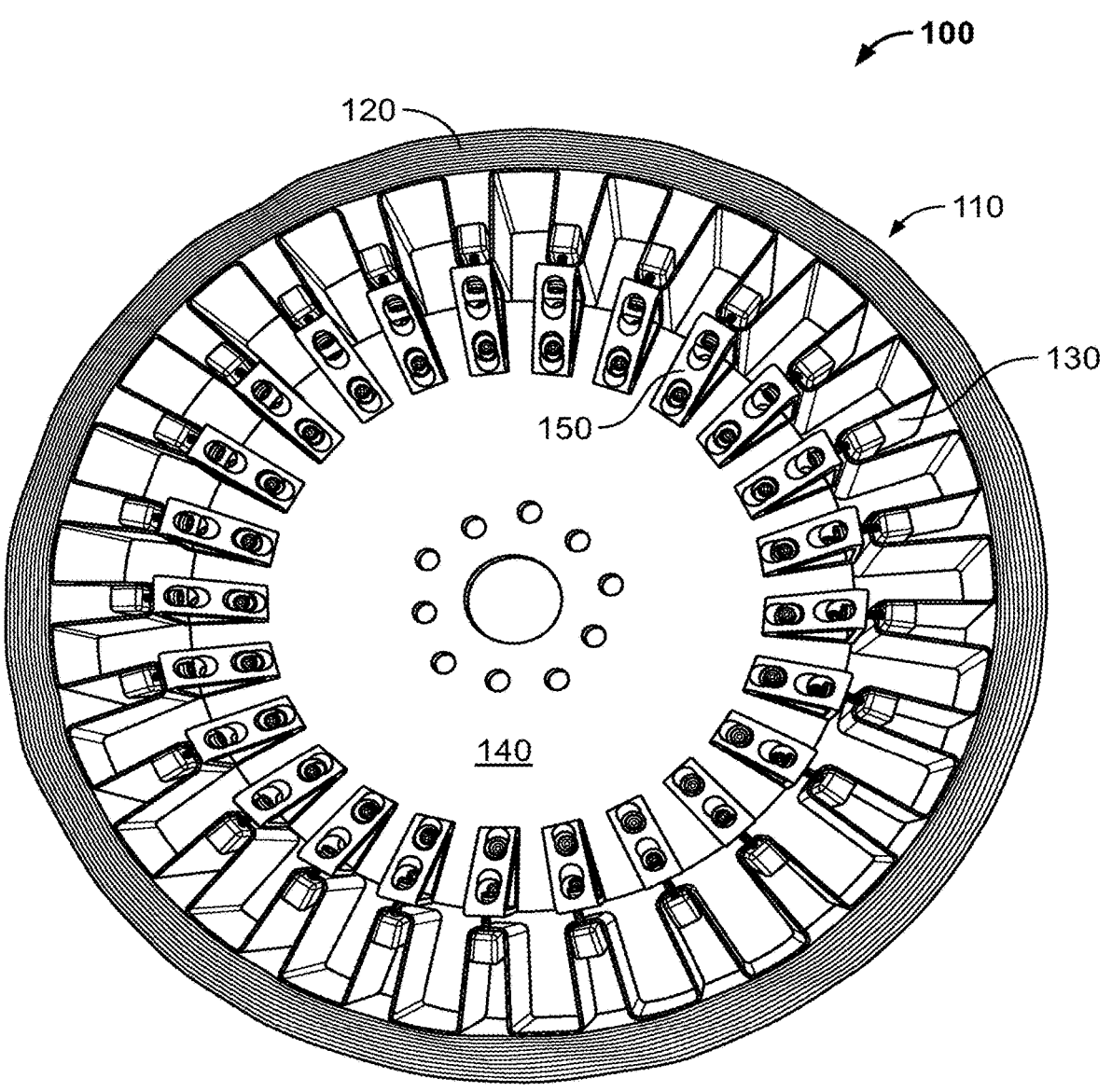
FIG. 1A illustrates a front view of one embodiment of a nonpneumatic tire 100.
Figure 1B:
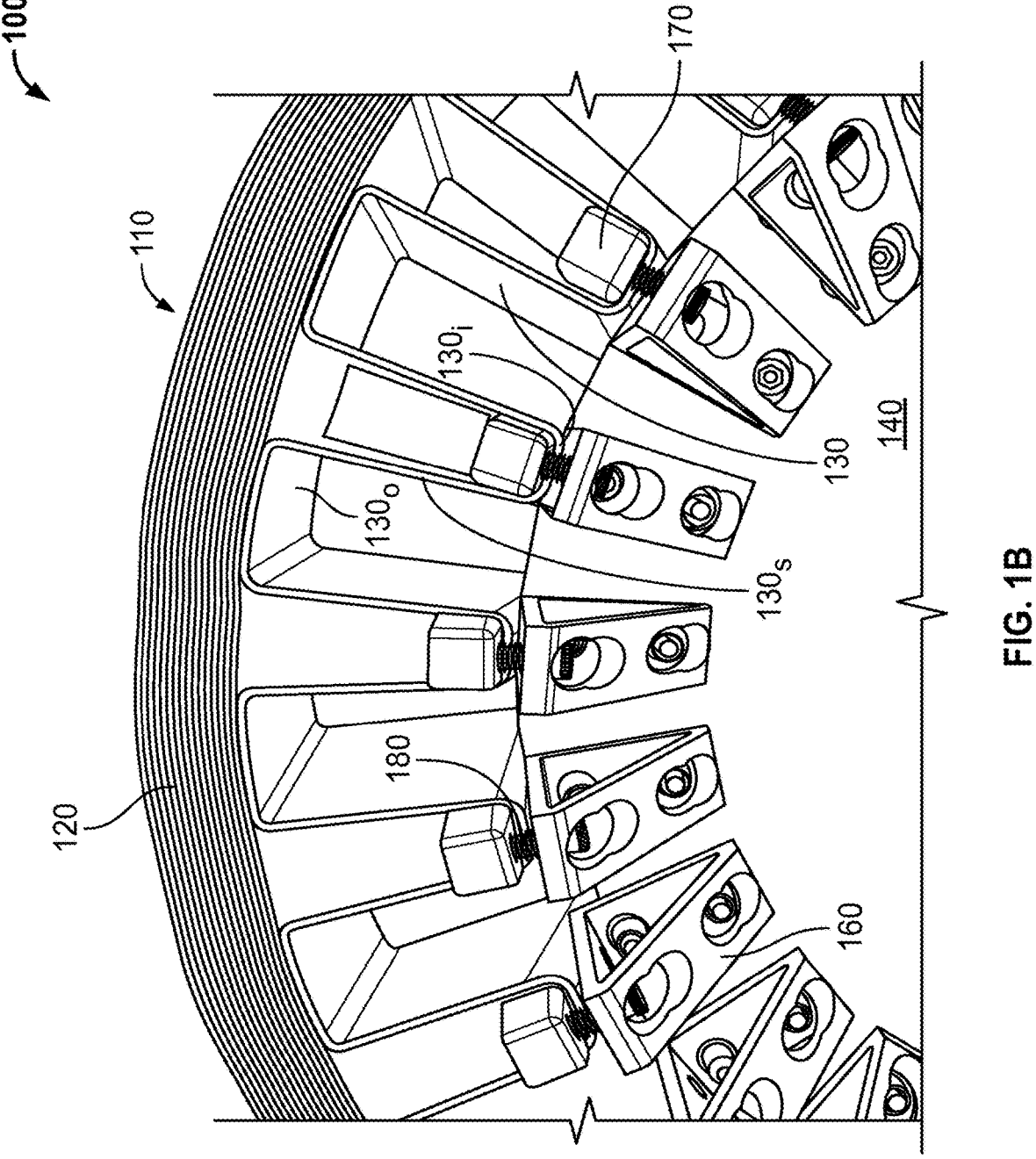
FIG. 1B illustrates a close up view of the nonpneumatic tire 100.

FIG. 1A illustrates a front view of one embodiment of a nonpneumatic tire 100, and FIG. 1B illustrates a close up view of the nonpneumatic tire 100. The tire 100 has a central axis and an equatorial plane, and is further described below with reference to both FIGS. 1A and 1B.

The tire 100 includes an outer hoop 110. In the illustrated embodiment, the outer hoop 110 is constructed of a rubber ply 120 that is wound about itself multiple times. The rubber ply 120 has a width equal to the width of the tire 100. Alternatively, the rubber ply may have a width narrower than the tire, and be spirally wound about the tire. In an alternative embodiment, rather than winding a single ply about itself, a plurality of rubber plies may be employed and spliced together. In such an embodiment, the different rubber plies may be constructed of different materials.

In one embodiment, the rubber ply 120 is constructed of two or more separate plies that are calendered or stitched together. In such an embodiment, a reinforcing material may be disposed between the calendered plies. For example, the rubber ply 120 may have reinforcement cords embedded therein, similar to a body ply for a pneumatic tire. In addition, or in the alternative, reinforcing components may be disposed between wrapped layers of the rubber ply 120. In one embodiment, one or more steel belt layers are disposed between layers of the rubber ply 120. One or more nylon layers may also be disposed between layers of the rubber ply 120. The nylon layer may be a sheet of nylon or a plurality of nylon cords. Other exemplary reinforcing components include polyester, Mylar, aramid fibers, other metal and polymeric materials, and other natural and synthetic materials.

In another embodiment, the rubber ply 120 may be a ply formed by weaving multiple plies together. In such an embodiment, reinforcement plies or reinforcement cords may be woven into the ply. The reinforcement plies or reinforcement cords may be constructed of the same materials described above.

The outer hoop 110 may also be constructed of a material other than rubber. In alternative embodiments, the outer hoop is formed by a ply constructed of a foamed polymer, polyurethane, thermoplastics, resins, or other elastomeric or polymeric material. In another alternative embodiment, the ply is constructed of metal instead of a polymeric material. In another alternative embodiment, the outer hoop 110 is a solid hoop.

The tire 100 further includes a plurality of loops 130 extending inward from the outer hoop 110. In the illustrated embodiment, the loops 130 are formed by a serpentine spoke ply disposed continuously about the central axis of the tire 100 such that a longitudinal axis of the serpentine spoke ply is substantially parallel to the equatorial plane of the tire 100. The serpentine spoke ply follows a winding path between an inner diameter and an outer diameter, such that the serpentine spoke path has a plurality of inner portions 130$_i$ that extend in a substantially circumferential direction about the inner diameter. The serpentine spoke path further has a plurality of outer portions 130$_o$ that extend in a substantially circumferential direction about the outer diameter. A plurality of spoke portions 130$_s$ extend in a substantially radial direction between the inner diameter and the outer diameter.

In the illustrated embodiment, all of the inner portions 130$_i$ have substantially the same arc length. Likewise, each outer portion 130$_o$ also has substantially the same arc length, with the arc length of the outer portions 130$_o$ being greater than the arc length of the inner portions 130$_i$. In one embodiment, a total arc length of the inner portions 130$_i$ is between 120 degrees and 240 degrees. A total arc length of the outer portions 130$_o$ is also between 120 degrees and 240 degrees. In one embodiment, a sum of the total arc length of the inner portions 130$_i$ and the total arc length of the outer portions 130$_o$ is 360 degrees. In an alternative embodiment, a sum of the total arc length of the inner portions and the total arc length of the outer portions is less than 360 degrees. In another alternative embodiment, a sum of the total arc length of the inner portions and the total arc length of the outer portions is greater than 360 degrees.

In an alternative embodiment, different inner portions may have different arc lengths. Likewise, different outer portions may also have different arc lengths.

In the illustrated embodiment, the loops 130 are constructed of a ply having a width equal to a width of the tire 100. In an alternative embodiment, the loops are constructed of a ply that is narrower than the tire. In such an embodiment, the ply may be biased with respect to the equatorial plane of the tire. In one such embodiment, each of the spoke portions of the serpentine spoke ply extends at an angle of less than 45 degrees with respect to the radial direction. Likewise, each of the inner portions of the serpentine spoke ply extends at an angle of less than 45 degrees with respect to the equatorial plane, and each of the outer portions of the serpentine spoke ply extend at an angle of less than 45 degrees with respect to the equatorial plane.

In one embodiment, the loops 130 are constructed of the same material as the outer hoop 110. In one particular embodiment, the loops 130 are formed by the same rubber ply 120 that forms the outer hoop 110. It should be understood that the loops 130 may be formed by any of the alternative ply embodiments discussed above, including the reinforced embodiments. In such an embodiment, the rubber ply 120 is shaped in a serpentine path to form the loops 130, and then wound about itself to form the outer hoop 130. It should be understood that the loops 130 may be formed by any of the alternative ply embodiments discussed above, including the reinforced embodiments. For example, the loops 130 may be constructed of two or more plies that are calendered or stitched together. A reinforcing material, such as reinforcement cords, may be disposed between adjacent plies. The reinforcing cords may be constructed of steel, nylon, polyester, Mylar, aramid fibers, other metal and polymeric materials, and other natural and synthetic materials.

In another embodiment, the loops 130 may be constructed of a ply formed by weaving multiple plies together. In such an embodiment, reinforcement plies or reinforcement cords may be woven into the ply. The reinforcement plies or reinforcement cords may be constructed of the same materials described above.

The loops 130 may also be constructed of a material other than rubber. For example, the loops 130 may be constructed of a foamed polymer, polyurethane, thermoplastics, resins, or other elastomeric or polymeric material. In another alternative embodiment, the loops 130 are constructed of metal instead of a polymeric material.

Figure 2A:
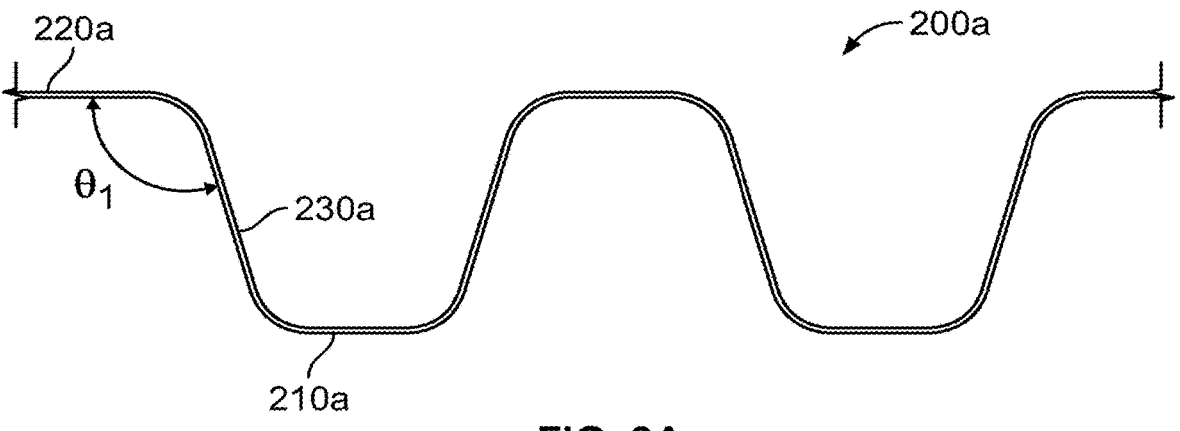
FIGS. 2A and 2B are schematic drawings illustrating an alternative embodiment of spoke loops for a nonpneumatic tire.

While FIGS. 1A and 1B show loops 130 having spoke portions $130_s$ that extend in a substantially radial direction, in alternative embodiment, the spoke portions extend in a non-radial direction. For example, FIG. 2A is a schematic drawing illustrating an alternative embodiment of loops 200a for a nonpneumatic tire. In this embodiment, the loop 200a has an inner portion 210a, an outer portion 220a and a spoke portion 230a. Instead of extending in a radial direction, each spoke portion 230a is disposed at an obtuse angle $\theta_1$ with respect to an adjacent outer portion 220a. In one embodiment, the obtuse angle $\theta_1$ is an angle between 90° and 180°.

Figure 2B:
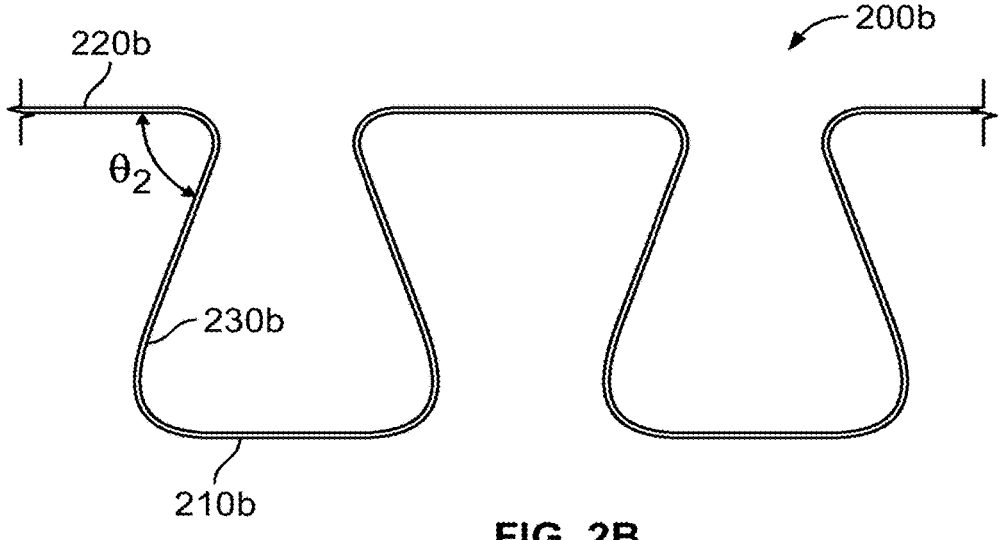

FIG. 2B is a schematic drawing illustrating another alternative embodiment of loops 200b for a nonpneumatic tire. In this embodiment, the loop 200b has an inner portion 210b, an outer portion 220b and a spoke portion 230b. Each spoke portion 230b is disposed at an acute angle $\theta_2$ with respect to an adjacent outer portion 220b. In one embodiment, the acute angle $\theta_2$ is an angle between 0° and 90°.

Returning to FIGS. 1A and 1B, the nonpneumatic tire 100 is mounted to a hub 140 configured to be mounted to a vehicle. The hub 140 has a plurality of mounting members 150, wherein each of the mounting members 150 is connected to one of the loops 130 of the tire 100. In the illustrated embodiment, each mounting member includes a flange portion 160 connected to the hub 140. Here, the flange portion 160 is bolted to the hub 140. In alternative embodiments, the flange portion may be connected to the hub by welding, by an adhesive, or by other connecting means. In another alternative embodiment, the mounting members do not include a flange portion, but instead the hub has one or more flanges.

Each mounting member 150 further includes a mounting bar 170 that engages the loop 130. Each mounting bar 170 is connected to a flange portion 160 by one or more bolts 180. The bolts 180 may be used to adjust the radial position of the mounting bar 170. In other words, each mounting member 150 is adjustable in a radial direction. The bolts 180 may be further tightened to apply tension to the loops 130 in a radial direction.

In alternative embodiments, other mounting members may be employed on the hub. For example, a cord or chain of material may be used to form a mounting loop that engages the loop 130 of the tire 100. As another example, hooks and clasps may be used as mounting members. In these examples, the mounting members may be adjustable or they may be fixed.

In one embodiment, the loops 130 are formed by building the outer hoop 110, and then cutting slots or opening in the outer hoop 110 to form loops. In another embodiment, the loops 130 are formed by a 3D printing or additive manufacturing process, by building the tire in an axial direction. In yet another embodiment, the loops 130 are formed by providing a forming jig having a plurality of members extending therefrom, and wrapping a ply about the members. This method of building a tire is described below with respect to FIGS. 3-7.

Figure 3:
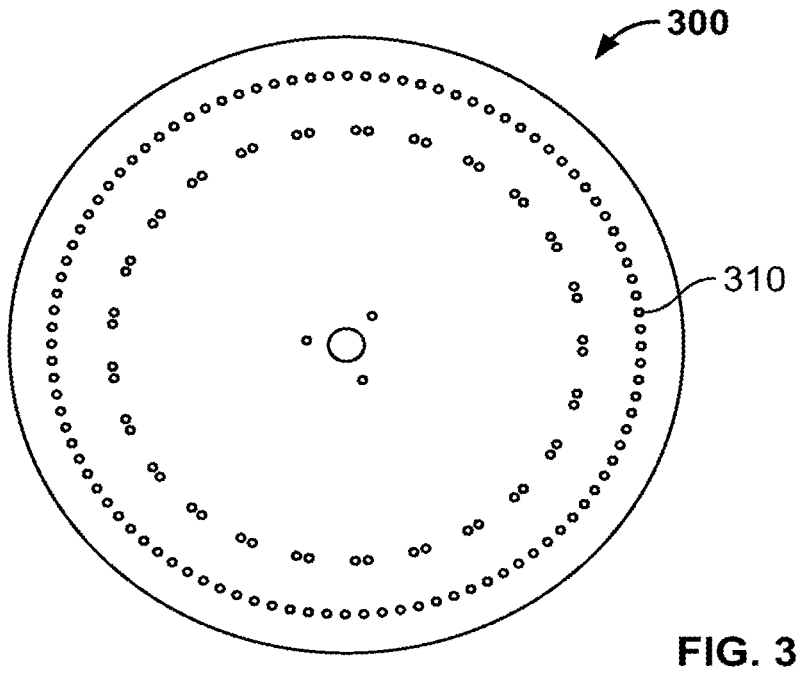
FIG. 3 illustrates a front view of one embodiment of a plate 300 of a jig for constructing a nonpneumatic tire.

FIG. 3 illustrates a front view of one embodiment of a plate 300 of a jig for constructing a nonpneumatic tire. The plate 300 includes a plurality of apertures 310 including a first set of apertures forming an inner circle with a first diameter and a second set of apertures forming an outer circle with a second diameter greater than the first diameter. While the plate 300 is shown as a circular plate, it should be understood that the plate may be square, rectangular, or have any geometric shape.

Figure 4:
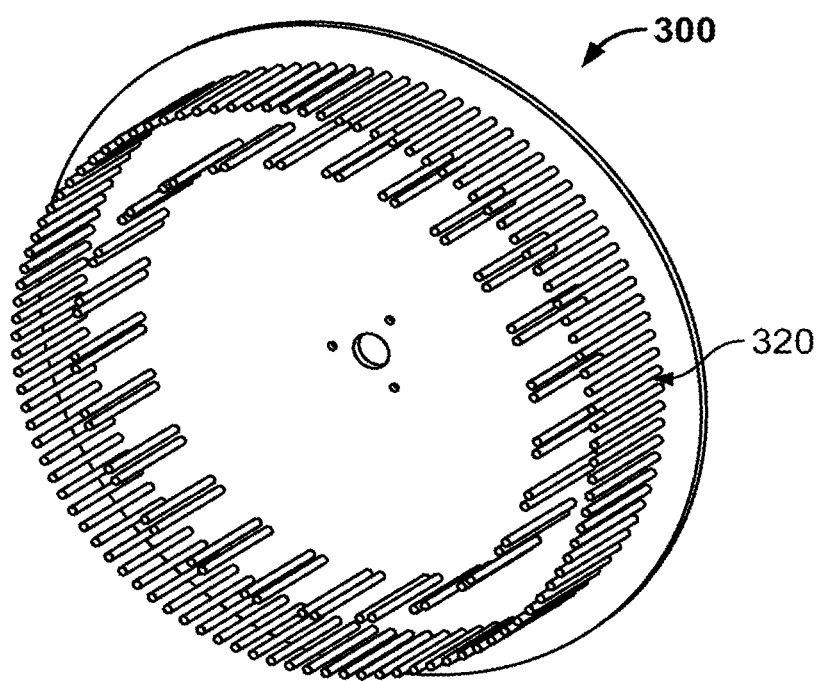
FIG. 4 illustrates a perspective view of a partially assembled jig including the plate 300 and projecting pins.

FIG. 4 illustrates a perspective view of a partially assembled jig including the plate 300 and projecting pins 320. In the illustrated embodiment, a projecting pin 320 is placed in each opening 310, such that a first set of projecting pins defines a first circle having the first diameter, and a second set of projecting pins defines a second circle having the second diameter. In the illustrated embodiment, a user may also elect to place projecting pins 320 in less than all of the openings 310 to form a tire with loops having different shapes.

In an alternative embodiment (not shown), a plurality of projecting plates or other members may be affixed to the plate 300. Such projecting plates may be affixed with bolts, screws, or other fasteners through the openings 310.

In another alternative embodiment (not shown) the plate has pre-formed projecting members extending therefrom. The projecting members may be, for example, pins or plates.

Figure 5A:
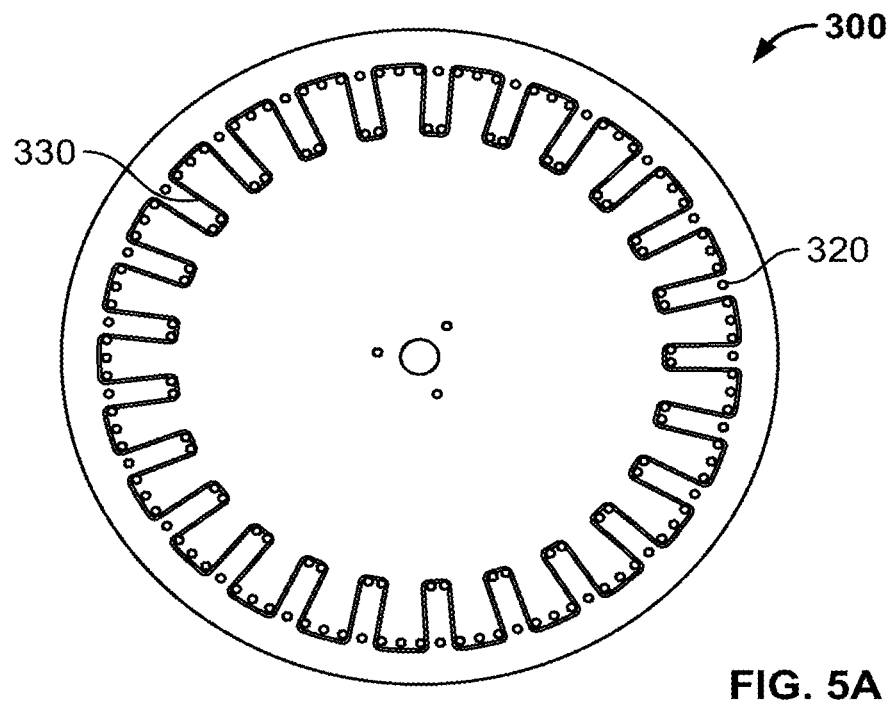
FIGS. 5A and 5B illustrate front and perspective views, respectively, of one embodiment a green, partially assembled nonpneumatic tire on the partially assembled jig.
Figure 5B:
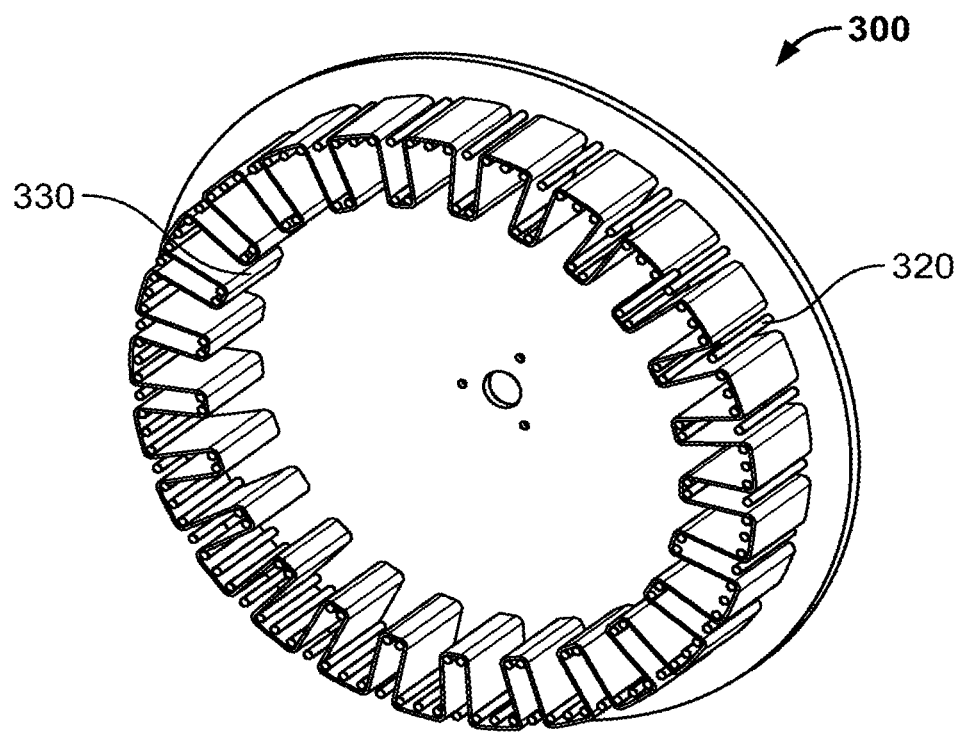

FIGS. 5A and 5B illustrate front and perspective views, respectively, of one embodiment a green, partially assembled nonpneumatic tire on the partially assembled jig. A flexible material 330 is wrapped about the projecting pins 320. In one embodiment, the flexible material 330 is a green rubber ply. In one particular embodiment, the flexible material 330 is two or more plies of green rubber that are calendered or stitched together. In such an embodiment, a reinforcing material may be disposed between adjacent plies. Exemplary reinforcing materials include, without limitation, steel, nylon, polyester, Mylar, aramid fibers, other metal and polymeric materials, and other natural and synthetic materials. In another embodiment, the flexible material 330 may be a ply formed by weaving multiple plies together. In such an embodiment, reinforcement plies or reinforcement cords may be woven into the ply. The reinforcement plies or reinforcement cords may be constructed of the same materials described above. In alternative embodiments, the flexible material 330 is a foamed polymer, polyurethane, thermoplastics, resins, or other elastomeric or polymeric material. In another alternative embodiment, flexible material 330 is a ply constructed of metal instead of a polymeric material.

The flexible material 330 is wrapped about the projecting pins 320 to form an annular shape. A portion of the flexible material 330 is wrapped on the inside of the inner projecting pins 320 and then extended to the outer projecting pins 320. The flexible material 330 is then wrapped around the outside of the outer projecting pins 320 and extended to the inner projecting pins 320. This process is repeated about the circumference of the first and second circles, so that the flexible material forms a serpentine shape.

In an alternative embodiment, the flexible material is a cord of material or a narrow ply of material. In such an embodiment, the cord or narrow ply may be biased such that it forms an angle with the equatorial plane of the tire as it is wrapped about the projecting pins.

Figure 6:
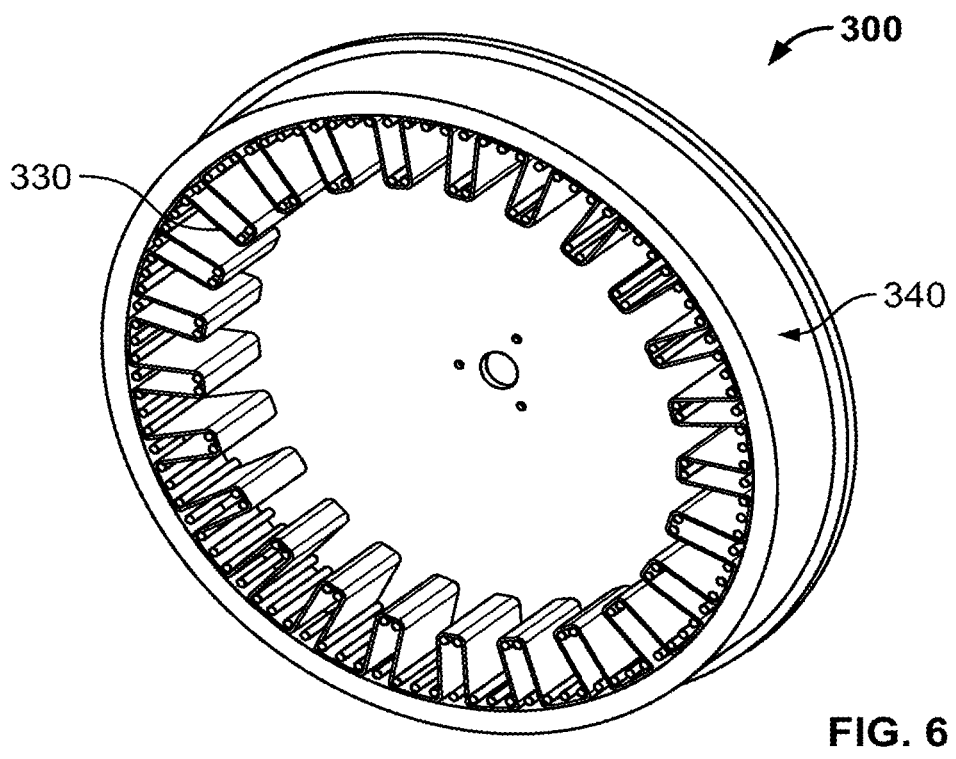
FIG. 6 illustrates a perspective view of one embodiment a green, assembled nonpneumatic tire on the partially assembled jig.

FIG. 6 illustrates a perspective view of one embodiment a green, assembled nonpneumatic tire on the partially assembled jig. At this stage, an outer hoop 340 is disposed about the serpentine-shaped flexible material 330. In one embodiment, the outer hoop 340 is a solid, annular hoop. In such an embodiment, the outer hoop may be constructed of the same material as the flexible material 330, or a different material. In an alternative embodiment, the outer hoop 340 is a ply of material wrapped about the serpentine-shaped flexible material 330 multiple times. In such an embodiment, reinforcing layers may be placed between layers of the wrapped ply. In one particular embodiment, the outer hoop 340 is formed by continuing to wrap the flexible material 330 over itself in a circular direction.

Figure 7:
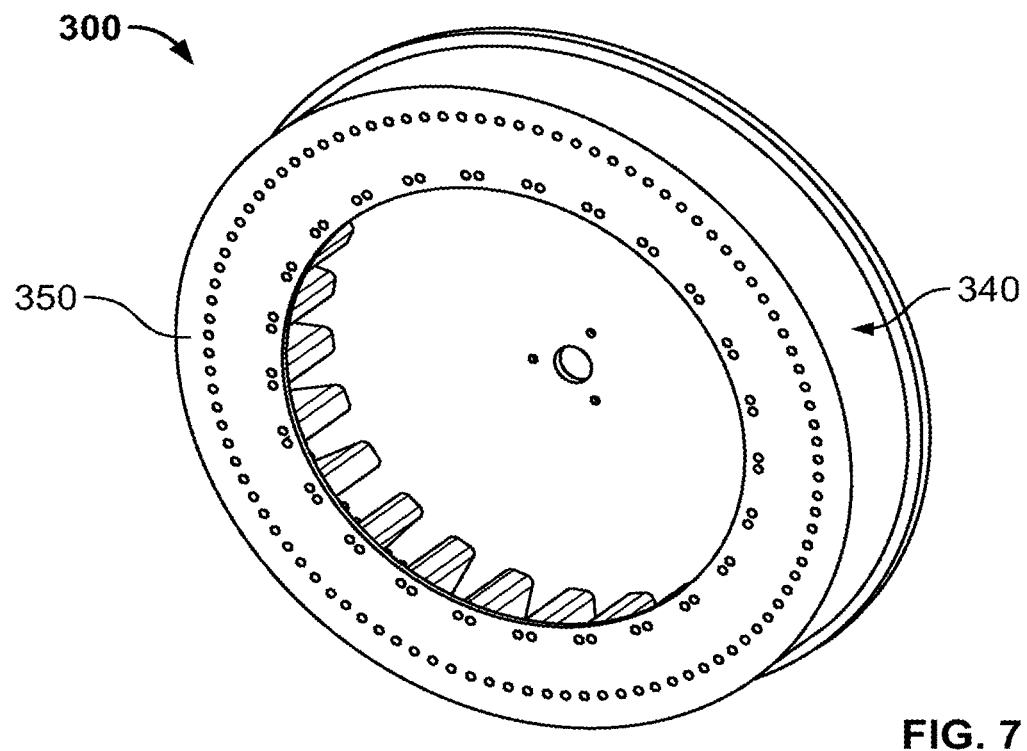
FIG. 7 illustrates a perspective view of one embodiment of a green, assembled nonpneumatic tire on an assembled jig.

FIG. 7 illustrates a perspective view of one embodiment of a green, assembled nonpneumatic tire on an assembled jig. At this stage, a second plate 350 is placed on projecting pins 330 to complete the assembly of the jig. The assembled green tire is then cured. In one embodiment, the green tire is cured in an autoclave. In an alternative embodiment, the tire is cured in a vulcanization mold. In another alternative embodiment, the tire is not cured after the initial build.

Figures 8, 9:
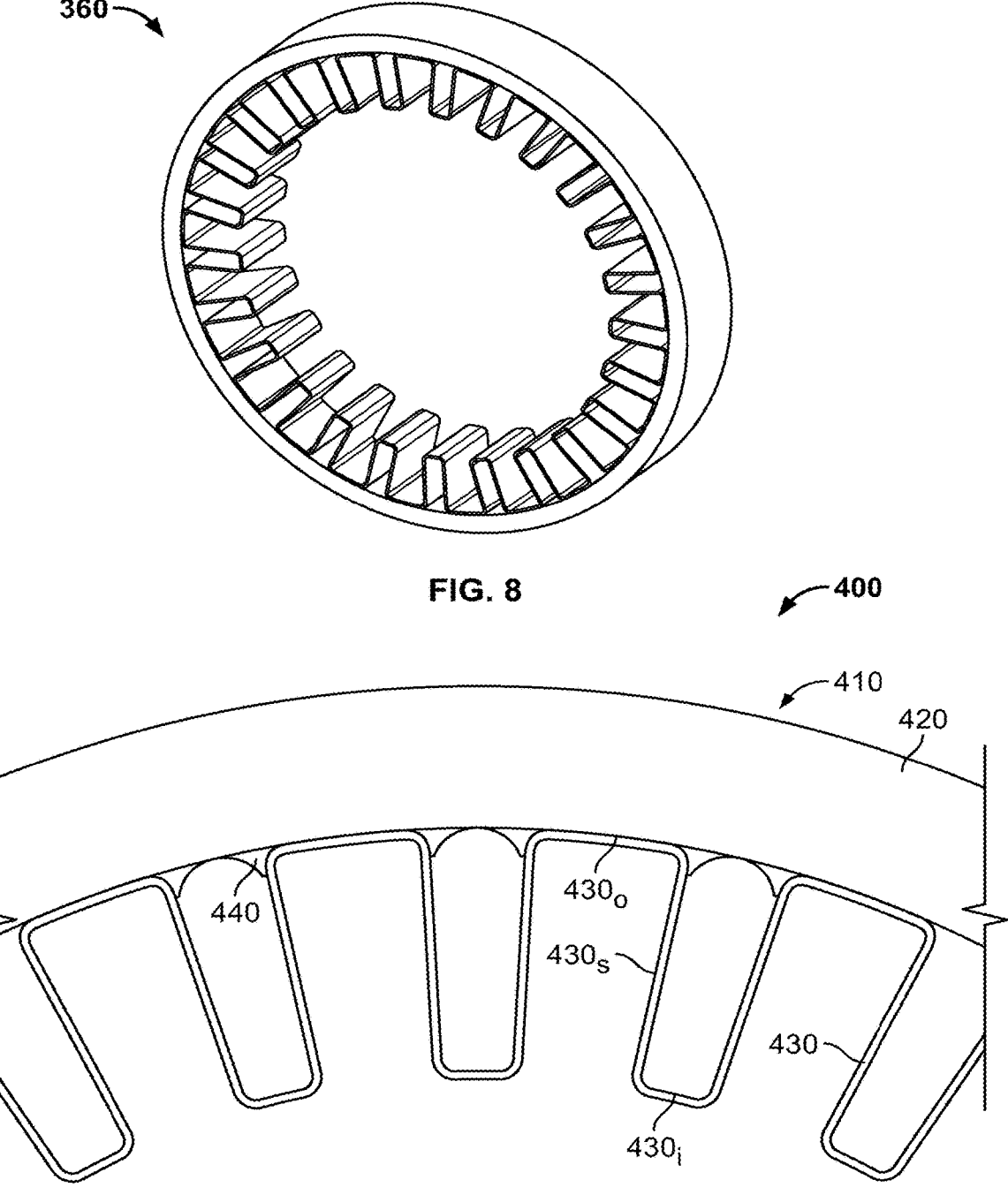
FIG. 8 illustrates a perspective view of one embodiment of a nonpneumatic tire.
FIG. 9 illustrates a close up front view of an alternative embodiment of a nonpneumatic tire.

After the tire is cured, it is removed from the jig. FIG. 8 illustrates a perspective view of a tire 360 formed by the process described above with respect to FIG. 3-7.

FIG. 9 illustrates a close up, front view of an alternative embodiment of a nonpneumatic tire 400. The tire 400 is substantially the same as the tire 100 shown in FIGS. 1A and 1B and described above (including the alternative embodiments described), except for the differences described below.

The tire 400 includes an outer hoop 410 that may be constructed of a rubber ply 420 that is wound about itself multiple times. The tire 400 further includes a plurality of loops 430 extending inward from the outer hoop 410. In the illustrated embodiment, the loops 430 are formed by a serpentine spoke ply disposed continuously about the central axis of the tire 400 such that a longitudinal axis of the serpentine spoke ply is substantially parallel to the equatorial plane of the tire 100. The serpentine spoke ply follows a winding path between an inner diameter and an outer diameter, such that the serpentine spoke path has a plurality of inner portions $430_i$ that extend in a substantially circumferential direction about the inner diameter. The serpentine spoke path further has a plurality of outer portions $430_o$ that extend in a substantially circumferential direction about the outer diameter. A plurality of spoke portions $430_s$ extend in a substantially radial direction between the inner diameter and the outer diameter.

In the illustrated embodiment, a fillet 440 is disposed between the spoke and hoop interface at locations circumferentially adjacent to each outer portion $430_o$ of the serpentine spoke path. Put another way, a fillet 440 is disposed radially above each inner portion $430_i$ of the serpentine spoke path.

In one embodiment, the fillet 440 is constructed from an extruded rubber compound and is applied to the tire in the green state and cured with the tire. The fillet 440 is added after the spoke ply is wrapped around the pins on the fixture and before the hoop is built on top of the spokes. The fillet 440 may increase resistance to separation of the spoke from the hoop due to fatigue.

In one embodiment, adjacent fillets 440 form a single arc extending from one spoke portion $430_s$ to an adjacent spoke portion $430_s$. In such an embodiment, the arc is defined by a single radius. In alternative embodiments (not shown), adjacent fillets are spaced apart from each other.

In the illustrated embodiment, each fillet 440 has the same radius. In alternative embodiments (not shown), fillets of different radii may be employed. In another alternative embodiment (not shown), a single fillet may be defined by multiple radii.

In one embodiment, the tire 400 is formed by building the outer hoop 410, and then cutting slots or opening in the outer hoop 410 to form loops. In another embodiment, the loops 430 are formed by a 3D printing or additive manufacturing process, by building the tire in an axial direction. In yet another embodiment, the loops 430 are formed by providing a forming jig having a plurality of members extending therefrom, and wrapping a ply about the members. This method of building a tire is described below with respect to FIGS. 9-14.

Figure 10:
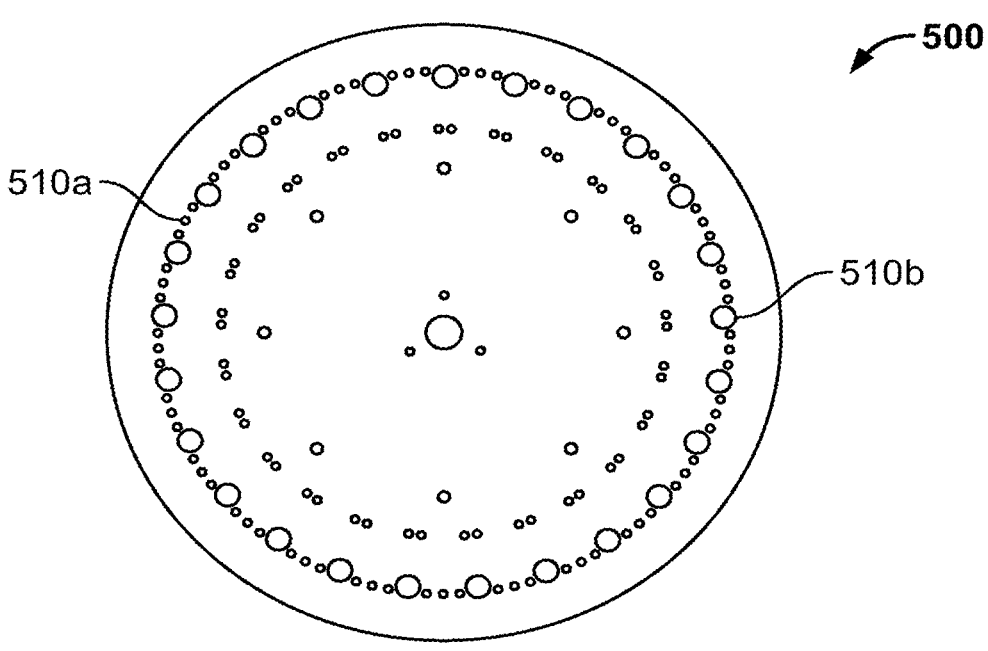
FIG. 10 illustrates a front view of an alternative embodiment of a plate 500 of a jig for constructing a nonpneumatic tire.

FIG. 10 illustrates a front view of one embodiment of a plate 500 of a jig for constructing a nonpneumatic tire. The plate 500 includes a plurality of small apertures 510a including a first set of small apertures forming an inner circle with a first diameter and a second set of small apertures forming an outer circle with a second diameter greater than the first diameter. The plate 500 further includes a plurality of large apertures 510b disposed along the outer circle. While the plate 500 is shown as a circular plate, it should be understood that the plate may be square, rectangular, or have any geometric shape.

Figure 11:
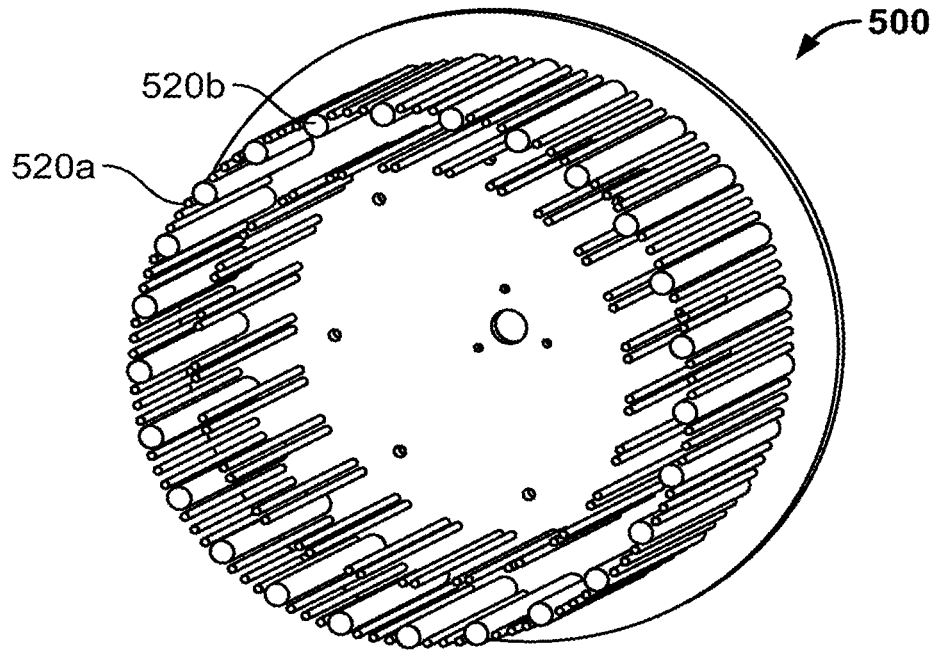
FIG. 11 illustrates a perspective view of a partially assembled jig including the plate 500 and projecting pins.

FIG. 11 illustrates a perspective view of a partially assembled jig including the plate 500, small diameter projecting pins 520a, and large diameter projecting pins 520b. In the illustrated embodiment, a projecting pin 520 is placed in each opening 510, such that a first set of projecting pins defines a first circle having the first diameter, and a second set of projecting pins defines a second circle having the second diameter. In the illustrated embodiment, a user may also elect to place projecting pins 520 in less than all of the openings 510 to form a tire with loops having different shapes.

In an alternative embodiment (not shown), a plurality of projecting plates or other members may be affixed to the plate 500. Such projecting plates may be affixed with bolts, screws, or other fasteners through the openings 510.

In another alternative embodiment (not shown) the plate has pre-formed projecting members extending therefrom. The projecting members may be, for example, pins or plates.

Figure 12A:
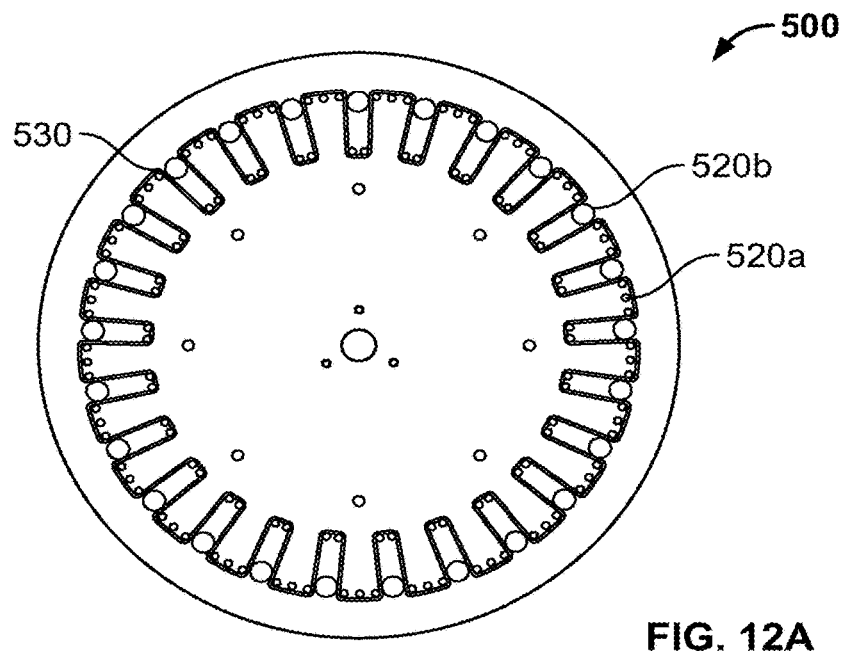
FIGS. 12A and 12B illustrate front and perspective views, respectively, of one embodiment a green, partially assembled nonpneumatic tire on the partially assembled jig.
Figure 12B:
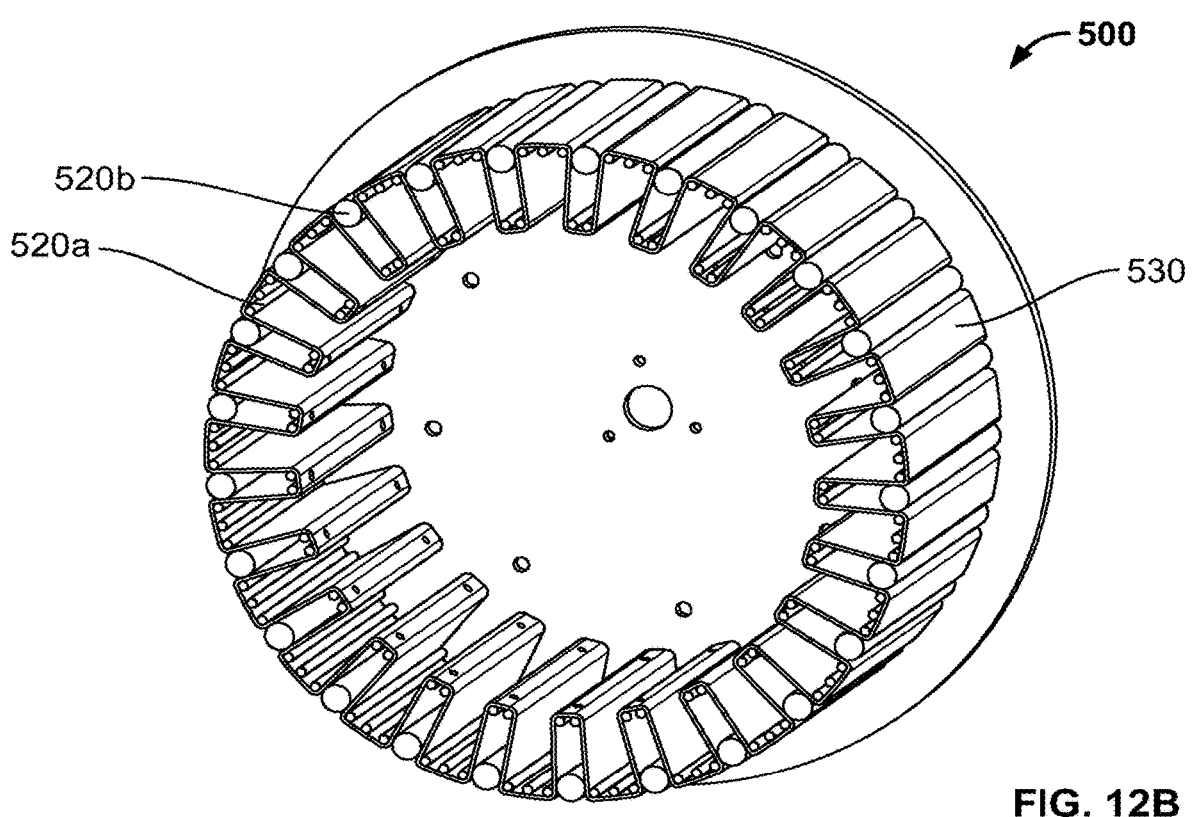

FIGS. 12A and 12B illustrate front and perspective views, respectively, of one embodiment a green, partially assembled nonpneumatic tire on the partially assembled jig. A flexible material 530 is wrapped about the projecting pins

520. The flexible material 530 may be any of the flexible materials discussed above with respect to FIGS. 3-7.

The flexible material 530 is wrapped about the projecting pins 520 to form an annular shape. A portion of the flexible material 530 is wrapped on the inside of the inner small diameter projecting pins 520*a* and then extended to the outer small diameter projecting pins 520*a*. The flexible material 530 is then wrapped around the outside of the outer small diameter projecting pins 520*a* and extended to the inner small diameter projecting pins 520*a*. This process is repeated about the circumference of the first and second circles, so that the flexible material forms a serpentine shape.

The flexible material 530 is wrapped such that the large diameter projecting pins 520*b* are disposed between the outer diameter portions of the serpentine shape of the material. In the illustrated embodiment, the flexible material 530 is tangent to two opposing points of each large diameter projecting pin. In an alternative embodiment (not shown), the flexible material is spaced from the large diameter projecting pins. In another alternative embodiment, two or more large diameter projecting pins may be employed between the outer diameter portions of the serpentine shape of the material. In another alternative embodiment (not shown), the large diameter projecting pins may be replaced by one or more projections of any shape that may form a fillet or a chamfered surface.

Figure 13A:
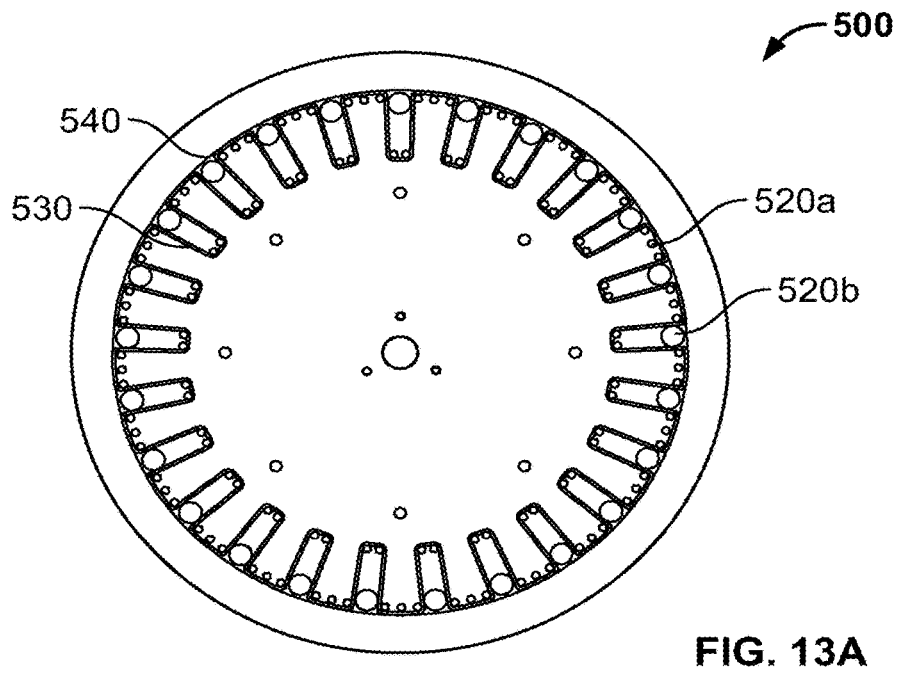
FIGS. 13A and 13B illustrate front and perspective views, respectively, of one embodiment a green, assembled nonpneumatic tire on the partially assembled jig.
Figure 13B:
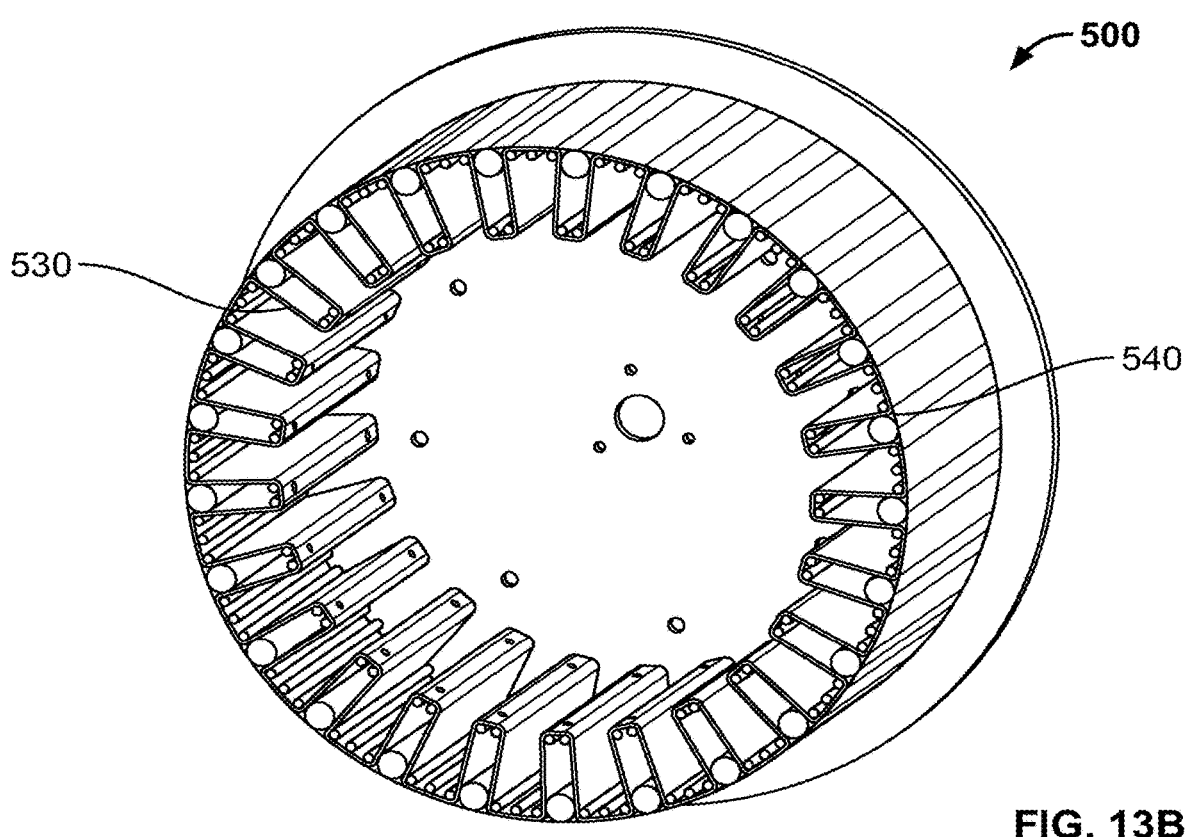

FIGS. 13A and 13B illustrate front and perspective views, respectively, of one embodiment a green, assembled nonpneumatic tire on the partially assembled jig. At this stage, extruded rubber segments 540 are placed on opposite sides of each large diameter projection pin 520*b*. These extruded rubber segments 540 extend across the entire width of the spoke and outer hoop, and will form fillets upon curing. In one embodiment, the extruded rubber segments 540 are constructed of the same material as the flexible material 530. In an alternative embodiment, the extruded rubber segments are formed of a different material than the flexible material. The extruded rubber segments may be solid rubber or may contain reinforcing material.

Figure 14:
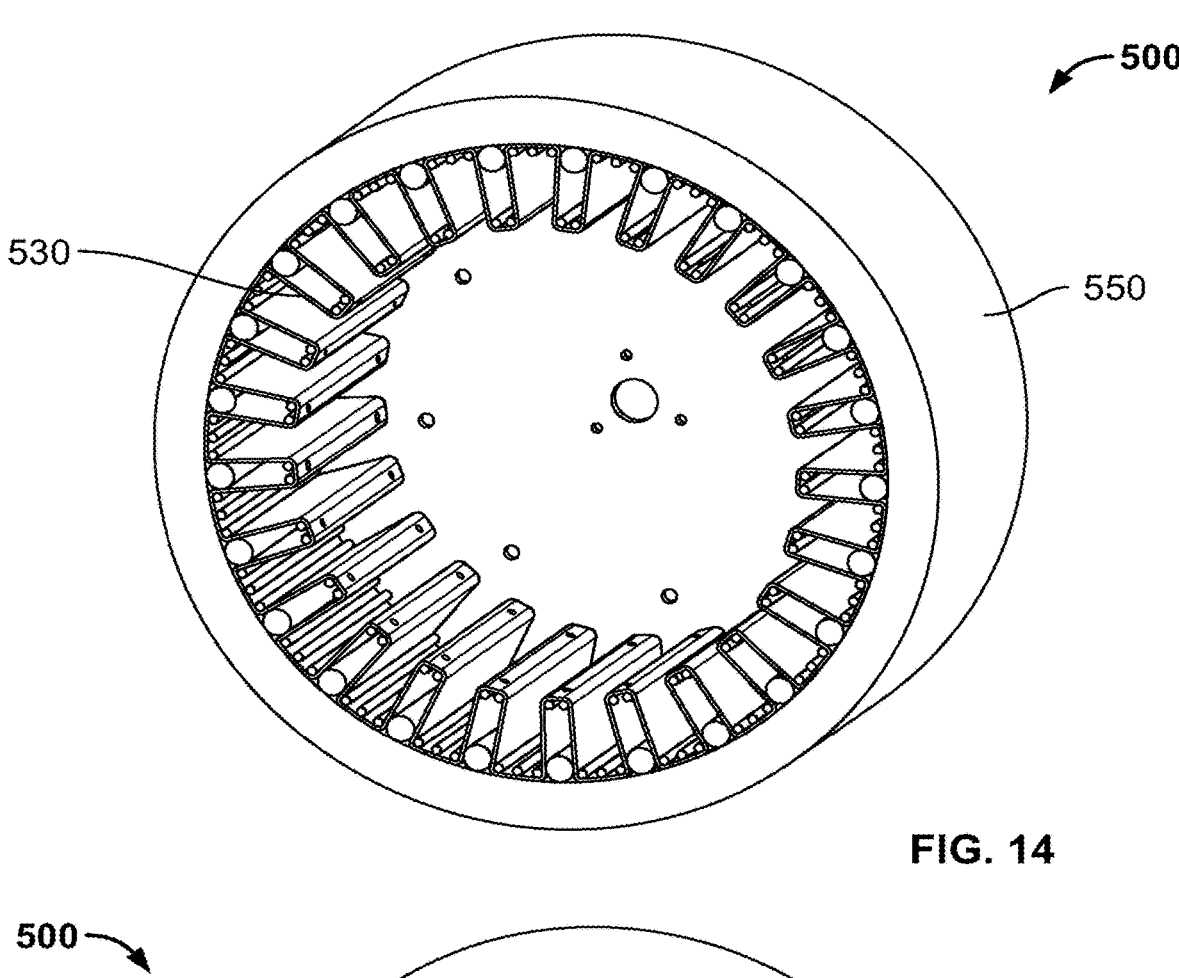
FIG. 14 illustrates a perspective view of one embodiment a green, assembled nonpneumatic tire on the partially assembled jig.

FIG. 14 illustrates a perspective view of one embodiment a green, assembled nonpneumatic tire on the partially assembled jig. At this stage, an outer hoop 550 is disposed about the serpentine-shaped flexible material 530. In one embodiment, the outer hoop 550 is a solid, annular hoop. In such an embodiment, the outer hoop may be constructed of the same material as the flexible material 530, or a different material. In an alternative embodiment, the outer hoop 550 is a ply of material wrapped about the serpentine-shaped flexible material 530 multiple times. In such an embodiment, reinforcing layers may be placed between layers of the wrapped ply. In one particular embodiment, the outer hoop 550 is formed by continuing to wrap the flexible material 530 over itself in a circular direction.

Figure 15:
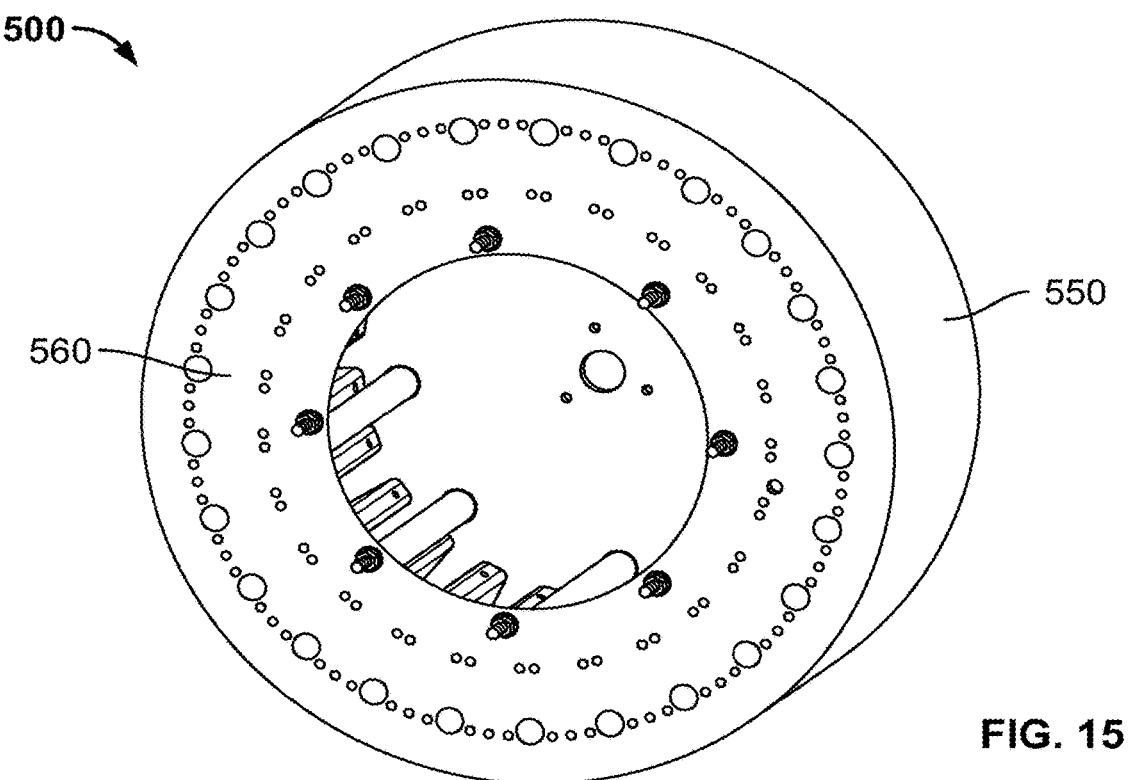
FIG. 15 illustrates a perspective view of one embodiment of a green, assembled nonpneumatic tire on an assembled jig.

FIG. 15 illustrates a perspective view of one embodiment of a green, assembled nonpneumatic tire on an assembled jig. At this stage, a second plate 560 is placed on projecting pins 520 to complete the assembly of the jig. The assembled green tire is then cured. In one embodiment, the green tire is cured in an autoclave. In an alternative embodiment, the tire is cured in a vulcanization mold. In another alternative embodiment, the tire is not cured after the initial build.

Figure 16:
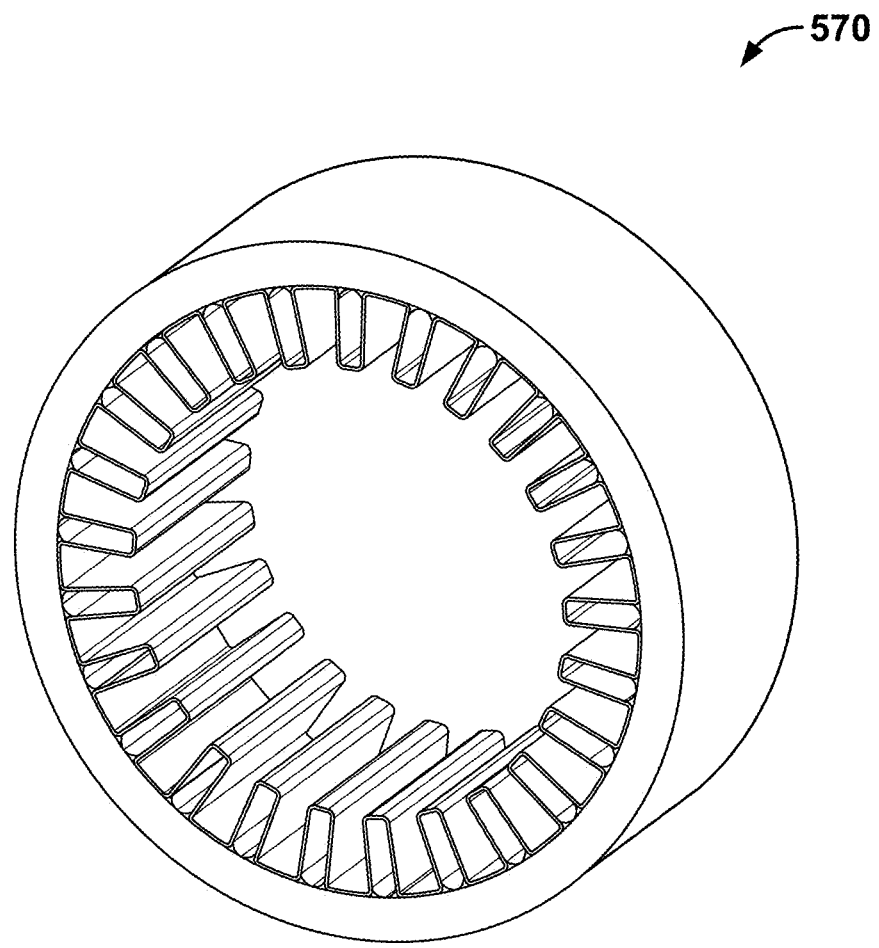
FIG. 16 illustrates a perspective view of one embodiment of a nonpneumatic tire.

After the tire is cured, it is removed from the jig. FIG. 16 illustrates a perspective view of a tire 570 formed by the process described above with respect to FIG. 11-15.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A nonpneumatic tire having a central axis and an equatorial plane, the nonpneumatic tire comprising:
    a serpentine spoke ply disposed continuously about the central axis of the nonpneumatic tire, such that the serpentine spoke ply follows a winding path between an inner diameter and an outer diameter, and such that the serpentine spoke ply has:
       a plurality of inner portions that extend in a substantially circumferential direction about the inner diameter,
       a plurality of outer portions that extend in a substantially circumferential direction about the outer diameter, and
       a plurality of spoke portions that extend between the inner diameter and the outer diameter;
    an outer hoop connected to the plurality of outer portions of the serpentine spoke ply; and
    a hub connected to a plurality of mounting members, the hub having a flange portion,
       wherein each of the plurality of mounting members includes a mounting bar and a plurality of radially extending bolts connecting the mounting bar to the flange portion of the hub,
       wherein each of the plurality of inner portions engages the mounting bar of a corresponding mounting member,
       wherein the mounting bar and the plurality of radially extending bolts are arranged such that tightening the plurality of radially extending bolts adjusts the radial position of the mounting bar, which applies tension to the serpentine spoke ply in a radial direction.

2. The nonpneumatic tire of claim 1, wherein each of the plurality of spoke portions of the serpentine spoke ply extends in a substantially radial direction.

3. The nonpneumatic tire of claim 1, wherein each of the plurality of inner portions of the serpentine spoke ply extends at an angle of less than 45 degrees with respect to the equatorial plane.

4. The nonpneumatic tire of claim 1, further comprising a plurality of fillets disposed between the spoke portions and the outer hoop.

5. The nonpneumatic tire of claim 1, wherein a total arc length of the plurality of inner portions of the serpentine spoke ply is between 120 degrees and 240 degrees.

6. The nonpneumatic tire of claim 5, wherein a total arc length of the plurality of outer portions of the serpentine spoke ply is between 120 degrees and 240 degrees.

7. The nonpneumatic tire of claim 6, wherein a sum of the total arc length of the plurality of inner portions of the serpentine spoke ply and the total arc length of the plurality of outer portions of the serpentine spoke ply is not more than 360 degrees.

8. A nonpneumatic tire assembly comprising:
an outer hoop;
a plurality of loops extending inward from the outer hoop;
a hub having a flange; and
a plurality of members connected to the flange of the hub by a plurality of radially extending bolts, each of the plurality of members connected to one of the plurality of loops, wherein each of the plurality of members is adjustable in a radial direction via the radially extending bolts.

9. The nonpneumatic tire assembly of claim 8, wherein the plurality loops are formed by a single sheet of material.

10. The nonpneumatic tire assembly of claim 8, wherein the plurality of loops are formed by cutting slots in the outer hoop.

11. The nonpneumatic tire assembly of claim 8, wherein the outer hoop and the plurality of loops are formed of the same material.

12. The nonpneumatic tire assembly of claim 8, wherein each of the plurality of members and the plurality of radially extending bolts are arranged such that tightening the plurality of radially extending bolts applies tension to the plurality of loops in a radial direction.

13. A nonpneumatic tire assembly comprising:
an outer hoop;
a plurality of loops extending inward from the outer hoop;
a hub connected to a plurality of mounting members, the hub having a flange portion,
wherein each of the plurality of mounting members includes a mounting bar and a plurality of radially extending bolts connecting the mounting bar to the flange portion of the hub,
wherein each of the plurality of loops engages the mounting bar of a corresponding mounting member,
wherein the mounting bar and the plurality of radially extending bolts are arranged such that tightening the plurality of radially extending bolts adjusts the radial position of the mounting bar, which applies tension to the plurality of loops in a radial direction.

14. The nonpneumatic tire assembly of claim 13, wherein each of the plurality of loops includes a portion that extends in a substantially radial direction.

15. The nonpneumatic tire assembly of claim 13, wherein each of the plurality of loops includes a portion that extends at an angle of less than 45 degrees with respect to an equatorial plane of the nonpneumatic tire.

16. The nonpneumatic tire assembly of claim 13 wherein each of the plurality of loops is formed by at least two plies of materials calendered together.

* * * * *